Jan. 31, 1967 A. BROODO 3,302,073
ELECTRICAL CAPACITORS AND ELECTRODE MATERIAL THEREFOR
Filed Oct. 21, 1963
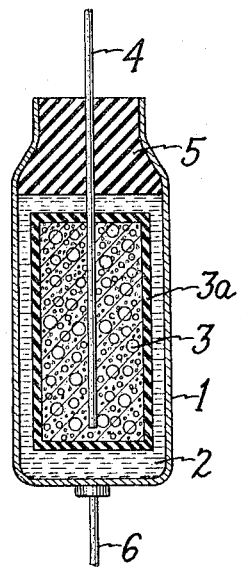
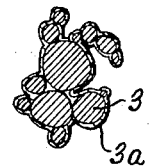
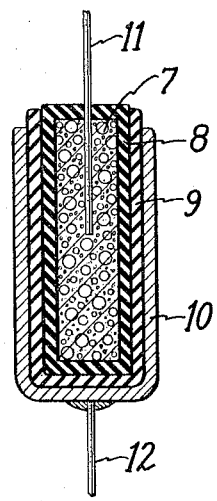
Inventor,
Archie Broodo,
by Sidney Greenberg
His Attorney.

United States Patent Office 3,302,073
Patented Jan. 31, 1967

3,302,073
ELECTRICAL CAPACITORS AND ELECTRODE
MATERIAL THEREFOR
Archie Broodo, Columbia, S.C., assignor to General
Electric Company, a corporation of New York
Filed Oct. 21, 1963, Ser. No. 317,831
6 Claims. (Cl. 317—230)

The present invention relates to electrical capacitors, and more particularly to electrode material for use in electrolytic capacitors.

The use of powdered film-forming metal particles such as tantalum for making the electrodes is well known in the electrolytic capacitor art, such material usually being compressed into the desired shape and density and sintered to form a porous electrode member. In the past, the metal powder has generally been produced by methods which yield irregular, jagged particles having sharp edges. Such particles have heretofore been considered desirable in order to obtain the maximum amount of surface area to provide the maximum capacitance per unit volume of capacitor. It has been found, however, that capacitor electrodes composed of such metal particles are subject to certain disadvantages, in that the unsymmetrical, sharp-pointed particles give rise during operation of the capacitor to high and irregular electrostatic field stresses which may lead to poor electrical properties and premature breakdown of the capacitor. Also, because of the irregular shape of the particles the density, pore size and capacitance per unit volume of electrodes made therefrom are not uniform throughout the body of the electrode and are difficult to control in the manufacture of such electrodes.

It is an object of the invention to provide improved electrolytic capacitors.

It is another object of the invention to provide sintered powder capacitor electrode structures having electrical and physical properties which are improved over prior structures of this type, including such properties as density, pore size, electrostatic field stress distribution, dissipation factor and reliability in operation.

Other objects and advantages will become apparent from the following description and the appended claims.

With the above objects in view, the present invention relates to electrical capacitors comprising a pair of electrodes, at least one of which consists of a porous body composed of a compressed sintered mass of substantially spherical particles of a film forming metal, the particles having a dielectric oxide film formed on the surfaces thereof. In a usual embodiment, the anode of the electrode is composed of the above described sintered mass of spherical particles and is impregnated with an electrolyte.

The invention will be better understood from the following description taken in conjunction with the accompanying drawing, in which:

FIGURE 1 is a cross-sectional view in elevation of a liquid type of electrolytic capacitor embodying the present invention;

FIGURE 2 is a somewhat schematic cross-sectional view of a solid electrolyte type of capacitor which may embody the present invention; and FIGURE 3 is a magnified cross-sectional representation of an electrode of the present invention.

Referring now to the drawing, and particularly to FIGURE 1, there is shown an electrolytic capacitor comprising a casing 1 serving as the cathode and containing a liquid electrolyte 2 in which an anode 3 is immersed. Casing 1 may be made of silver or any other metal which does not adversely affect the electrolyte or become corroded thereby. Anode 3 in accordance with the invention is made of spherical particles of a film forming metal, such as tantalum, which may be made by powder metallurgy techniques, wherein the spherical particles of the metal are compressed and sintered into a compact mass to provide a large continuous surface area for contact with electrolyte 2. A film-forming lead wire 4 made of the same metal as anode 3 or other film-forming metals is embedded in the body of anode 3 and passes to the exterior of casing 1 through an insulating sealing plug 5 around which the upper end of the casing 1 is crimped to provide a fluid-tight closure for the capacitor. At the opposite end of the capacitor, a cathode lead 6 is suitably joined by welding or otherwise to the outside of casing 1.

The surfaces of the spherical particles forming the mass of anode 3 which can be considered as one large continuous surface are provided with a thin anodic dielectric oxide film by subjecting anode 3 to an anodizing treatment, in accordance with processes well known in the electrolytic capacitor art. The anodic dielectric oxide thus formed is shown schematically in FIGURE 1 as layer 3a, it being understood that in reality such a film actually coats the particles of anode 3 individually which, in effect, provides a continuous film over the continuous surface of the particles.

The invention is also applicable to solid electrolyte type capacitors, such as disclosed, for example, in British Patent 747,051. Shown in schematic form in FIGURE 2 is such a solid electrolyte capacitor, comprising a porous anode 7 composed of a compressed sintered mass of spherical particles of film-forming metal, an anodic dielectric oxide film 8 on the anode particles, a layer 9 of semi-conductive material such as $MnO_2$, and an outer coating 10 of conductive material such as graphite servnig as the counter electrode or cathode. Lead wire 11 is embedded in anode 7 and lead wire 12 is joined, e.g., by soldering, to conductive coating 10, to provide terminal connections respectively to the anode and the cathode. The various layers 8, 9 and 10 are shown on the outside of anode body 7 for purpose of illustration, it being understood that in reality the described superimposed layers overlie the particles of anode 7 individually as a result of the processing of the porous anode body in producing such coating, substantially as shown in the aforementioned British patent.

FIGURE 3 is a section of a sintered anode body made of spherical tantalum powder in accordance with the invention magnified approximately 100 times. The sharp edges and projections characterizing the particles of conventional capacitor grade tantalum powder used in a sintered anode body are entirely absent from the anode structure made of spherical particles as the surface of each respective particle has a substantially constant radius of curvature. The spherical nature of the particles shown also makes it possible to more uniformly control the density, pore size and capacitance per unit volume of the anode structure. The spheres may be more uniformly packed in the mass than the irregularly shaped particles of the conventional metal powder, and the mass of sperical particles can be more readily impregnated with electrolytic solution, since there is less restriction to the passage of the liquid than would be the case with the sharply projecting metal particles which tend to interlock or interfit with one another.

It is known that high dielectric stresses occur at jagged points and that dielectric breakdown occurs most frequently at such points. The anodic dielectric oxide films are actually in tension at the surfaces, and the points of maximum stress occur at the thinnest sections of dielectric oxide where such sharp points exist on the substrate metal prior to formation. As spherical particles are used in the subject invention, no sharp points exist on the surface of the particles so that no section of the dielectric film is thinner than any other (i.e., the film is of uniform thickness). The use of spherical powder threfore allows lower ratios of formation voltage to rated voltage to be used, and accordingly, makes possible larger values of volt-microfarad product in presently used case sizes. It has been experimentally shown that the breakdown stress between spherically shaped electrodes is 2.2 to 2.5 times as great as for needle point electrodes using the same dielectric material.

Furthermore, in the manufacture of solid electrolyte capacitors, it is difficult to coat a sharp edge with a uniform thickness of material such as $MnO_2$, since the solution used for decomposition of $MnO_2$ tends to draw thin around sharp corners. The lack of sharp edges inside a porous anode made with spherical powder enhances the capability of impregnating the anode inner surfaces with a uniform coating of material such as $MnO_2$.

The spherical powder particles may be made by known procedures, and such powder is commercially available. The manufacture of such particles may, for example, be achieved by allowing a stream of molten metal in a protective atmosphere to flow through a small orifice and meeting the molten metal stream with a blast of chilled inert gas. The blast disintegrates the metal into small particles. Since the small particles have low mass and high surface to volume ratio, they are chilled and solidified rapidly.

In a typical procedure for forming capacitor anodes in accordance with the invention, spherical film-forming metal particles of desired size and range are mixed with suitable organic binder material such as stearic acid, polyethylene glycol, chlorinated naphthalenes, polyoxylene ethers, or camphor, the amount of binder material used usually being up to 15% by weight of the mixture. The mixture is thoroughly blended, as by tumbling, stirring in a solvent, or other known techniques. The mixed binder and powder in dry form are compacted to a density of about seven and one-half to nine and one-half grams per cc., depending on the design requirements of the capacitor which is to incorporate the anode. The binder material is then removed by heating the compacted body in a vacuum furnace at a temperature ranging from 500° C. to 800° C., depending on the metal used as the anode. The metal compact is then sintered in a vacuum furnace or a furnace with a controlled atmosphere, depending on the nature of the anode material and purity of the atmosphere available. Metals such as tantalum, zirconium, niobium and titanium are generally sintered in a vacuum of the order of $1\times10^{-5}$ mm. Hg, but they might also be sintered under a protective atmosphere of helium or argon. Other metals such as aluminum are more commonly sintered in protective atmosphres of helium, argon or hydrogen, but may also be sintered in a vacuum. Sintering parameters of time and temperature may be varied to give the desired results. The temperature for sintering may run between 0.5 and 0.9 time the melting point of the metal and may be held for periods of time from five minutes to five hours.

In a specific example of the above process using spherical tantalum powder, polyethylene glycol (Carbowax) as a binder material, in the ratio of 2% by weight of the tantalum powder was blended by dissolving the Carbowax in a solvent, mixing thoroughly with the spherical powder and then removing the solvent by evaporation. This mix was pressed to a density of 10.3 grams per cc. in a small mechanical press. After presintering at 600° C. for one hour to remove the binder, the anodes were sintered at 2050° C. for 45 minutes in a vacuum of $0.2\times10^{-5}$ mm. Hg. The capacitance of these anodes was found to be 600 volt microfarads/gram. These anodes were made with the powder particle distribution as received from the manufacturer of the spherical powder and pressed to a density chosen at random.

The actual density achieved by the process can be precisely controlled and varied to result in both higher or lower capacitance as desired much more easily than with conventional metal powder. In addition, it is possible to control the powder particle size distribution in combination with the density control to achieve considerably higher capacitance. The capacitance may be further increased by etching the spheres in a manner similar to that already used in etching tantalum foil.

In general the size of the particles of metal should range from between 40 mesh to about −325 mesh, which represent a size range of about 420 microns to about 2 microns. Anodes made with particles of a size greater than the above range are not desirable because of unduly lessened capacitance of the anode, whereas particles having sizes smaller than the indicated range lead to difficulties in satisfactorily impregnating the anode and result in somewhat higher impurity content of the powder and higher leakage current than desirable.

In tests made on electrolytic capacitors embodying the present invention, capacitors having a construction similar to that described above were built as 2.2 microfarad 35 volt units. When compared to units made with conventional powders manufactured at the same time, the yields from the spherical powder anodes were 15 to 20% higher. Typical life test results with regard to failures at 85° C. and rated voltage showed comparable low failure rates. The capacitors made from spherical powder anodes underwent 114,000 unit hours of testing with no failures, and also showed less change with regard to leakage current at 85° C. and capacitance. The improvement in dissipation factor was greater by a factor of 2 to 3 in comparison with capacitors made from conventional powder anodes.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical capacitor comprising, in combination, a pair of electrodes, at least one of which consists of a porous body composed of a compressed sintered mass of solid substantially spherical particles of a film-forming metal, of a size varying from about 2 to about 420 microns forming a continuous surface throughout said body, the surface of each respective particle having a substantially constant radius of curvature in the non-sintered portions, said continuous surface having a continuous dielectric oxide film of substantially uniform thickness thereon, an electrolyte covering the surface of said oxide film and the other of said pair of electrodes contacting said electrolyte.

2. An electrical capacitor as in claim 1 wherein said electrolyte is a liquid which impregnates said porous electrode body.

3. An electrical capacitor as in claim 1 wherein said electrolyte is a semi-conductive reducibe oxide material.

4. An electrical capacitor as in claim 3 wherein said semi-conductive material is $MnO_2$.

5. An electrode for an electrolytic capacitor which consists of a porous body composed of a compressed sintered mass of solid, substantially spherical particles of a film-forming metal of a size varying from about 2 to about 420 microns forming a continuous surface throughout said body, the surface of each respective particle having a substantially constant radius of curvature in the non-sintered portions, said continuous surface having a continuous dielectric oxide film of substantially uniform thickness thereon.

6. An electrode as in claim 5 wherein the film-forming metal is tantalum.

(References on following page)

References Cited by the Examiner

UNITED STATES PATENTS

| | | | |
|---|---|---|---|
| 2,299,228 | 10/1942 | Gray et al. | 317—230 |
| 2,406,345 | 8/1946 | Brennan | 317—230 |
| 3,004,332 | 10/1961 | Werner | 317—230 |
| 3,056,072 | 9/1962 | Schroeder et al. | 317—230 |
| 3,166,693 | 1/1965 | Haring et al. | 317—230 |

OTHER REFERENCES

Treatise of Powder Metallurgy, by C. G. Goetzel, Interscience Publishers, New York (1949–1952). Copy available in Group 110. This treatise is in IV Vols. It is incorporated into the Werner patent by reference and forms part of its disclosure. Vol. I pages 92–96 and 43–45, specifically relied on.

JAMES D. KALLAM, *Primary Examiner.*